US012633241B2

(12) United States Patent
Kim

(10) Patent No.: US 12,633,241 B2
(45) Date of Patent: May 19, 2026

(54) DISPLAY DEVICE AND METHOD FOR DETECTING BENDING POSITION OF DISPLAY DEVICE

(71) Applicant: LG Display Co., Ltd., Seoul (KR)

(72) Inventor: JangHwan Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/908,619

(22) Filed: Oct. 7, 2024

(65) Prior Publication Data

US 2025/0273107 A1 Aug. 28, 2025

(30) Foreign Application Priority Data

Feb. 22, 2024 (KR) ......................... 10-2024-0025771

(51) Int. Cl.
*G09G 3/00* (2006.01)
*G06F 3/041* (2006.01)

(52) U.S. Cl.
CPC ........... *G09G 3/035* (2020.08); *G06F 3/0412* (2013.01); *G06F 3/0416* (2013.01); *G06F 2203/04102* (2013.01); *G09G 2354/00* (2013.01)

(58) Field of Classification Search
CPC ...... G06F 3/035; G06F 3/0412; G06F 3/0416; G06F 2203/04102; G09G 2354/00
See application file for complete search history.

(56) References Cited

U.S. PATENT DOCUMENTS

| | | | | |
|---|---|---|---|---|
| 2016/0282974 A1* | 9/2016 | Li | .......................... | G06F 1/1694 |
| 2019/0393278 A1* | 12/2019 | Wu | ....................... | G01D 5/2417 |
| 2020/0033205 A1* | 1/2020 | Mori | ..................... | H10N 30/857 |
| 2020/0126488 A1* | 4/2020 | Ouyang | ................... | G09G 3/20 |

* cited by examiner

*Primary Examiner* — Liliana Cerullo
(74) *Attorney, Agent, or Firm* — Birch, Stewart, Kolasch & Birch, LLP

(57) ABSTRACT

A display device can include a bendable display panel configured to display an image, and a piezoelectric element array film overlapping the display panel. The piezoelectric element array film can include piezoelectric power generation elements arranged in a matrix structure, and is configured to detect a capacitance change amount generated in the piezoelectric power generation elements according to bending of the display panel. The display device can further include a read-out circuit configured to receive and process a bending detection signal including the capacitance change amount generated in the piezoelectric power generation elements, and a read-out processor configured to detect whether bending of the display panel occurs and a position where the bending occurs, based on the bending detection signal.

5 Claims, 15 Drawing Sheets

100

TOUCH DRIVING STEP — S810

BENDING DRIVING STEP — S820

DISPLAY DEVICE AND METHOD FOR DETECTING BENDING POSITION OF DISPLAY DEVICE

CROSS-REFERENCE TO RELATED APPLICATION

This application claims priority to Korean Patent Application No. 10-2024-0025771, filed in the Republic of Korea on Feb. 22, 2024, the entire contents of which is hereby expressly incorporated by reference into the present application.

BACKGROUND

Field

Embodiments of the disclosure relate to a display device and a method for detecting a bending position of the display device.

Discussion of the Related Art

A display device displays various images to provide information to a user. Recently, bendable display devices are being developed. Unlike flat-panel display devices, flexible display devices are foldable or rollable like paper. The flexible display device which can be changed into various shapes are easy to carry and can enhance user convenience.

SUMMARY OF THE DISCLOSURE

The disclosure provides a display device and a method for detecting a bending position of the display device, which can detect whether a flexible display device is bent or can detect the position of the bending of the display device.

A display device according to an embodiment of the disclosure can comprise a bendable display panel configured to display an image, a piezoelectric element array film overlapping the display panel, having piezoelectric power generation elements arranged in a matrix structure, and configured to detect capacitance change amount generated in the piezoelectric power generation elements according to bending of the display panel, a read-out circuit configured to receive and process a bending detection signal including the capacitance change amount generated in the piezoelectric power generation elements, and a read-out processor configured to detect whether bending of the display panel occurs and a position where the bending occurs, based on the bending detection signal.

A method for detecting a bending position of a display device, according to an embodiment of the disclosure, can comprise detecting, by a read-out processor, a touch signal generated on a display panel in a touch mode section based on an integrated pad, and detecting, by the read-out processor, a bending detection signal generated on the display panel in a bending mode section based on the integrated pad. Detecting the bending signal includes detecting, per coordinates, a capacitance change amount occurring in piezoelectric power generation elements provided in a matrix structure and overlapping the display panel, and detecting bending coordinates where bending occurs based on the capacitance change amount detected per coordinates of the piezoelectric power generation elements.

According to embodiments of the disclosure, it is possible to detect bending in a flexible display device and accurately detect the position of such bending.

According to embodiments of the disclosure, it is possible to reduce an area occupied by bending detection lines in the bezel area and thus decrease the width of the bezel area.

According to embodiments of the disclosure, as bending detection lines supplying a common electrode to a piezoelectric element array film are shared as one bending detection shared line, it is possible to increase use efficiency of elements relative to the area occupied by the signal lines and decrease the weight of the display device.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION OF THE EMBODIMENTS

Figure 1:
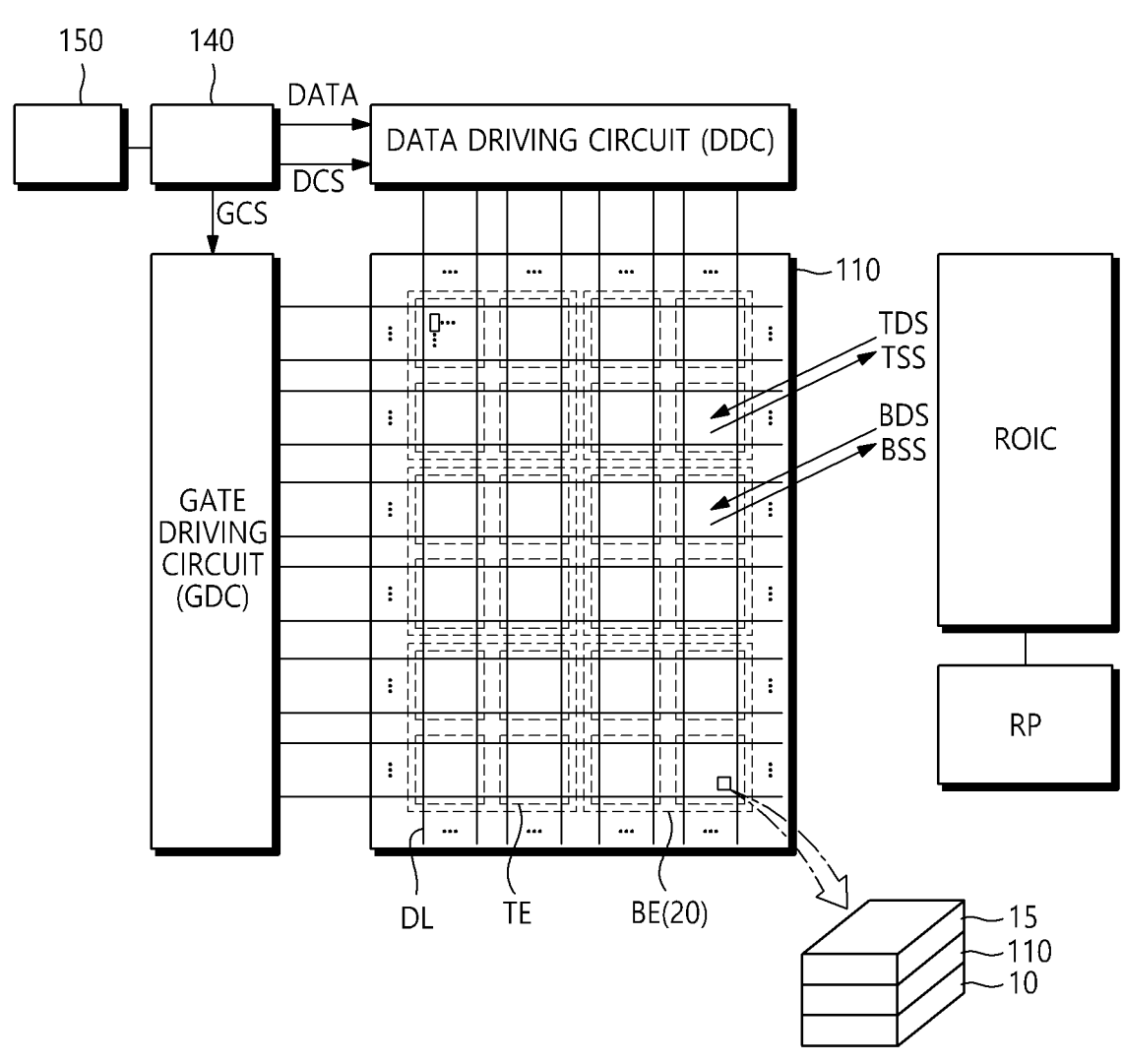
FIG. 1 is a view schematically illustrating a system configuration of a display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description can make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "can" fully encompasses all the meanings of the term "may".

Hereinafter, various embodiments of the disclosure are described in detail with reference to the accompanying drawings. All the components of each display device according to all embodiments of the present disclosure are operatively coupled and configured.

FIG. 1 is a view illustrating a system of a display device according to the present embodiments of the disclosure.

Referring to FIG. 1, a display device 100 according to the present embodiments can include a display panel 110 and various circuits.

The display device 100 according to the present embodiments can perform a display function for displaying an image, a touch function for sensing a touch by a pointer such as a finger or a pen, and a bending function for sensing bending of the display device.

Accordingly, the display device 100 according to the present embodiments can operate in a display mode during a display mode section for the display function, can operate in a touch mode during a touch mode section for the touch function, or can operate in a bending mode during a bending mode section for the bending function.

The display mode section, the touch mode section, and the bending mode section can be temporally separated or can be temporally the same section.

In other words, the display mode operation for image display, the touch mode operation for touch sensing, and the bending mode operation for bending sensing can be performed separately, or the display mode operation for image display, the touch mode operation for touch sensing, and the bending mode operation for bending sensing can be performed together. For example, the touch mode operation and the bending mode operation can be set by time-division of a blank section of one frame period.

On the display panel 110 according to the present embodiments, a plurality of data lines DL and a plurality of gate lines GL for displaying an image can be arranged, and a plurality of subpixels SP defined by the plurality of data lines DL and the plurality of gate lines GL can be arranged. Further, the display panel 110 according to the present embodiments can simultaneously serve as a touch screen panel (TSP). To that end, a plurality of touch electrodes TE serving as a touch sensor for touch sensing can be disposed on the display panel 110 according to the present embodiments.

Further, the display panel 110 according to the present embodiments can simultaneously serve as a flexible panel. To that end, a plurality of piezoelectric power generation elements BE serving as bending sensors for bending sensing can be disposed on the display panel 110 according to the present embodiments. The plurality of piezoelectric power generation elements BE can be arranged in a matrix structure on a piezoelectric element array film 10 having a size corresponding to the display panel 110.

The display device 100 can include a data driving circuit DDC and a gate driving circuit GDC to drive the display panel 110 during the display mode section, and can further include at least one controller for controlling operation timing or power supply of the data driving circuit DDC and the gate driving circuit GDC.

In order to drive the display panel 110 during the touch mode section, the display device 100 can include a read-out circuit (or read out integrated circuit, hereinafter referred to as "ROIC") for driving the plurality of touch electrodes TE, and a read-out processor RP for determining the presence or absence of a touch and/or the position of a touch based on a signal received from the touch electrodes TE to which a touch driving signal TDS is applied in the touch mode section. The read-out processor can be a touch processor.

The read-out circuit ROIC can supply a touch driving signal TDS to the plurality of touch electrodes TE to drive the plurality of touch electrodes TE. Further, the read-out circuit ROIC can receive a touch sensing signal TSS from each touch electrode TE to which the touch driving signal TDS is supplied.

The read-out circuit ROIC transfers the received touch sensing signal TSS or sensing data obtained by processing the received touch sensing signal TSS to the read-out processor RP.

The read-out processor RP can execute a touch algorithm using the touch sensing signal TSS or sensing data, thereby determining the presence or absence of a touch and/or the position of a touch.

As described above, the display device 100 according to the present embodiments employs a self-capacitance-based touch sensing scheme for figuring out the presence or absence of a touch and/or the position of a touch by identifying a change in capacitance between each touch electrode TE and a pointer. In other words, in the display device 100 according to the present embodiments, a touch driving signal TDS is applied to each touch electrode TE and a touch sensing signal TSS is detected.

Alternatively, the display device 100 according to the present embodiments can employ a mutual-capacitance-based touch sensing scheme. For convenience of description, the disclosure is described below with self-capacitance touch sensing as an example.

In order to drive the display panel 110 during the bending mode section, the display device 100 can include a read-out circuit ROIC for driving a plurality of piezoelectric power generation elements BE, and a bending processor for determining whether there is bending and/or a bending position based on a signal received from the piezoelectric power generation elements BE to which a bending driving signal BDS is applied in the bending mode section. Here, the bending processor can be implemented by being integrated with the read-out processor RP. Hereinafter, the bending processor is described as a read-out processor RP.

The read-out circuit ROIC can supply a bending driving signal BDS to the plurality of piezoelectric power generation elements BE to drive the plurality of piezoelectric power generation elements BE. Further, the read-out circuit ROIC can receive a bending sensing signal BSS from each of the piezoelectric power generation elements BE to which the bending driving signal BDS is supplied.

The read-out circuit ROIC transfers the received bending sensing signal BSS or bending data obtained by signal-processing the bending sensing signal BSS to the read-out processor RP.

Meanwhile, the data driving circuit DDC, the gate driving circuit GDC, the read-out circuit ROIC, and the read-out processor RP mentioned above are classified so in terms of functions, and can be implemented separately or, in some cases, two or more of the data driving circuit DDC, the gate driving circuit GDC, the read-out circuit ROIC, and the read-out processor RP can be integrated.

Figure 2:
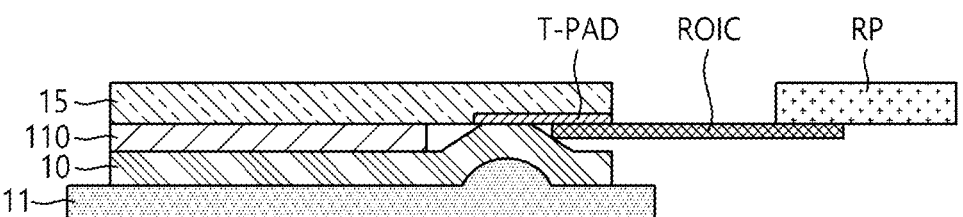
FIG. 2 is a cross-sectional view illustrating a portion of a display device according to an embodiment of the disclosure.
Figure 3:
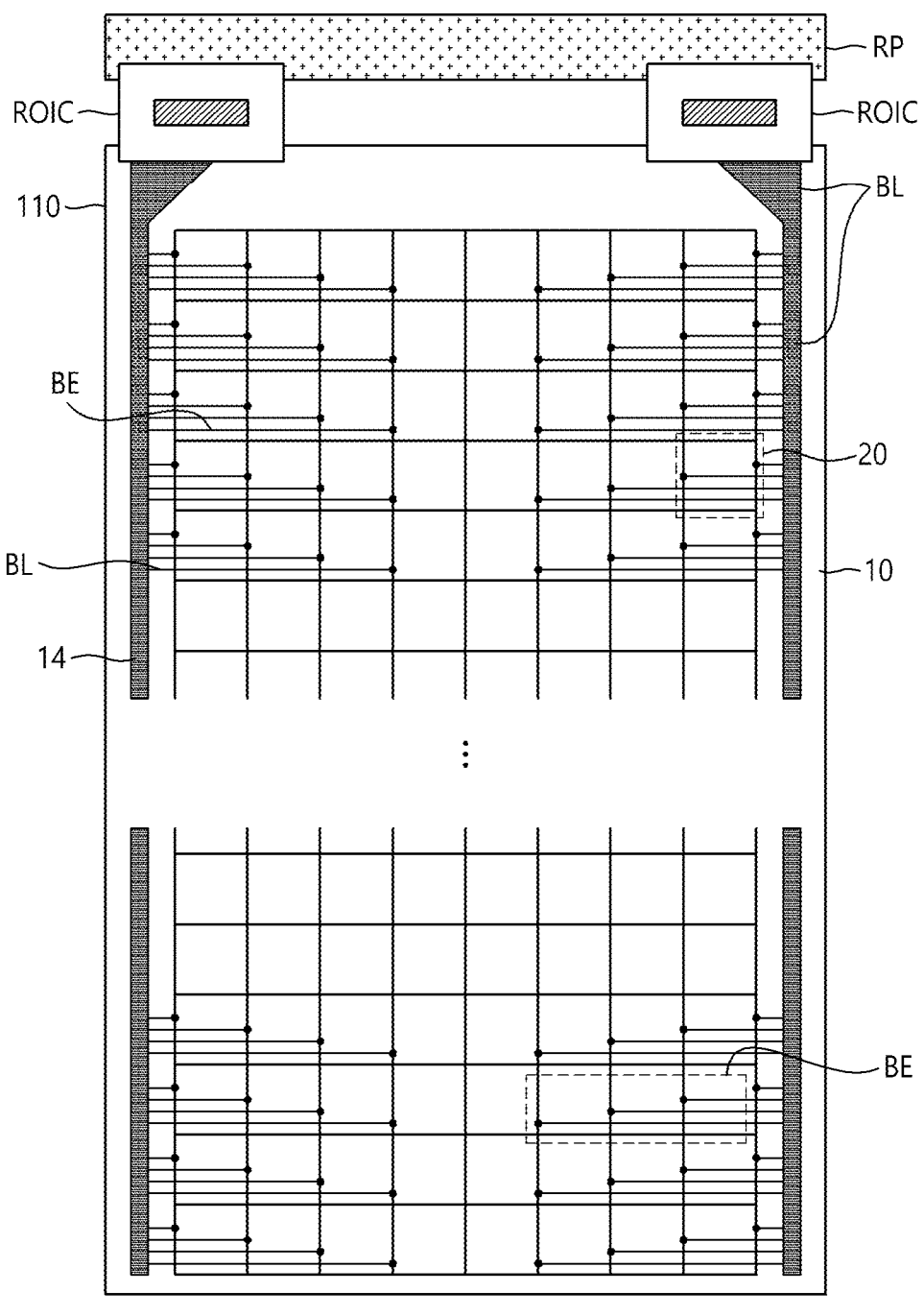
FIG. 3 is a partial plan view illustrating the display device having the piezoelectric element array film of FIG. 2.

FIG. 2 is a cross-sectional view illustrating a portion of a display device according to an embodiment of the disclosure. FIG. 3 is a partial plan view illustrating the display device having the piezoelectric element array film of FIG. 2.

Referring to FIGS. 2 and 3, the display device 100 according to an embodiment of the disclosure can include the piezoelectric element array film 10 and the read-out processor RP to implement a three-dimensional (3D) input. For example, an occurrence of bending can be detected through the piezoelectric element array film 10 integrated into the display device 100, the degree of stress caused by bending can be calculated as a digital value through the read-out processor RP, and three-dimensional coordinates can be detected from the position of the bending and the digital value corresponding to the degree of stress.

The touch panel 15 includes a plurality of touch electrodes TE. The piezoelectric element array film 10 includes a plurality of piezoelectric power generation elements BE.

Referring to FIGS. 1 to 3, the display device 100 can include a display panel 110 displaying an image, touch electrodes TE disposed over the display panel 110, a touch line TL connected from the touch electrodes TE to a read-out circuit ROIC, a piezoelectric element array film 10 disposed under the display panel 110, piezoelectric power generation elements BE disposed in a matrix structure on the piezoelectric element array film 10, a bending detection line BL connected to each piezoelectric power generation element BE, a touch detection pad T-PAD commonly connected to the touch line TL and the bending detection line BL, a read-out circuit ROIC, and a touch controller RP.

In the touch mode, the touch detection pad T-PAD can be connected to the touch panel 15 to transfer the touch driving signal TDS to the touch panel 15 through the read-out circuit ROIC, and can transfer the touch sensing signal TSS received from the touch panel 15 to the read-out circuit ROIC.

In the bending mode, the touch detection pad T-PAD can be connected to the piezoelectric element array film 10 to transmit the bending driving signal BDS to the piezoelectric element array film 10 through the read-out circuit ROIC, and can transfer the bending sensing signal BSS received from the piezoelectric element array film 10 to the read-out circuit ROIC.

Referring to FIG. 1, the touch panel 15 can include a plurality of touch electrodes TE.

Referring to FIGS. 1 and 3, the piezoelectric element array film 10 can include a plurality of piezoelectric power generation elements BE, 20.

The piezoelectric element array film 10 can include piezoelectric power generation elements BE that overlap the display panel 110 and are arranged in a matrix structure in each unit section of the piezoelectric element array film 10.

In other words, the piezoelectric element array film 10 can include unit sections 20 arranged in a matrix structure, and each unit section 20 can overlap an area in which a plurality of subpixels are arranged.

The piezoelectric element array film 10 can be provided with the same area as the display panel 110. Alternatively, the piezoelectric element array film 10 can be provided with an area having a smaller plane than the display panel 110.

The piezoelectric element array film 10 can include piezoelectric power generation elements BE in which a physical change due to bending occurs in each unit section 20 when bending occurs on the display panel 110.

Each of the piezoelectric power generation elements BE can be connected to the read-out circuit ROIC through the bending detection line BL, and the bending sensing signal BSS including the physical change generated by each of the piezoelectric power generation elements BE can be transferred to the read-out circuit ROIC through the bending detection line BL.

As an embodiment, the bending detection signal BSS including the physical change amount generated in the piezoelectric power generation element BE can be transferred to the read-out circuit ROIC through the bending detection line BL(+).

As such, when bending occurs on the display panel 110, the piezoelectric element array film 10 can detect a physical change occurring in the piezoelectric power generation elements BE due to bending and transfer the bending detection signal BSS including the physical change to the read-out circuit ROIC.

The read-out circuit ROIC can transmit bending data obtained by signal-processing the bending detection signal BSS to the touch controller RP, and the touch controller RP can detect whether bending occurs and/or the position of bending based on bending data including physical changes occurring in each of the piezoelectric power generation elements BE.

The area size of one touch electrode TE can be the same as or similar to the area size of one subpixel, but can correspond to the area size of two or more subpixels for touch sensing efficiency.

Further, the size of the unit section 20 of the matrix structure including one piezoelectric power generation element BE in the piezoelectric element array film 10 can correspond to the area size of two or more subpixels or can be larger than the area size of the touch electrode TE. FIG. 1 illustrates an example in which one unit section 20 of the piezoelectric element array film 10 corresponds to four touch electrodes TE, but the size of the unit section is not limited thereto.

Referring to a cross-sectional view schematically illustrating a portion of the display device illustrated in FIG. 2, a touch pad T-PAD can be connected to at least one end of the touch panel 15, a wearable panel 110 provided as a basic panel can be disposed under the touch panel 15, and a piezoelectric element array film 10 can be disposed under the wearable panel 110.

A jig 11 for attaching the piezoelectric element array film 10 illustrated below the piezoelectric element array film 10 is a component that includes a jig so that a concave or convex portion is formed in at least a portion of the piezoelectric element array film 10 and can be a component that is used only during the process.

When the piezoelectric element array film 10 is pressed on the wearable panel 110 and the touch pad T-PAD, at least a portion of the piezoelectric element array film 10 can be convexly bent by the jig 11 for attaching the piezoelectric element array film so that the touch pad T-PAD and the piezoelectric element array film 10 can come into contact with each other.

Figure 4A:
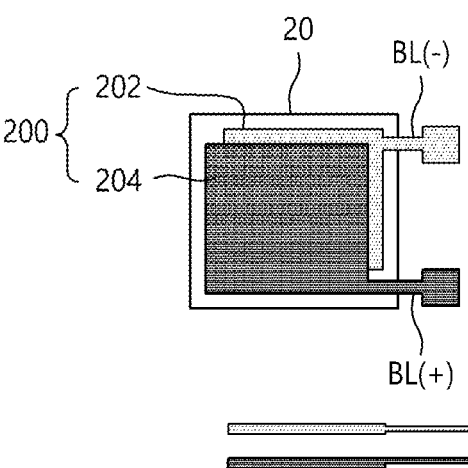
FIG. 4A is a partial plan view illustrating an example of a piezoelectric power generation element according to an embodiment of the disclosure.
Figure 4B:
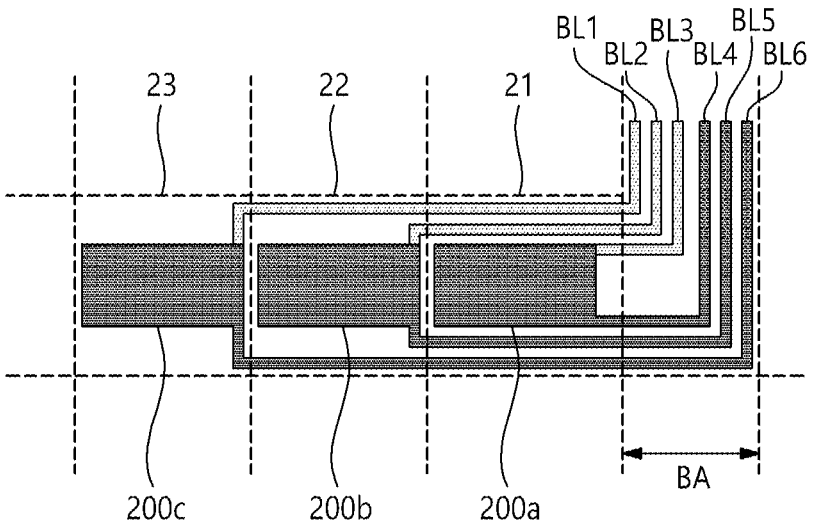
FIGS. 4B, 4C, and 4D are partial plan views illustrating an example of a piezoelectric power generation element and a bending detection line arranged on a piezoelectric element array film according to an embodiment of the disclosure.
Figure 4C:
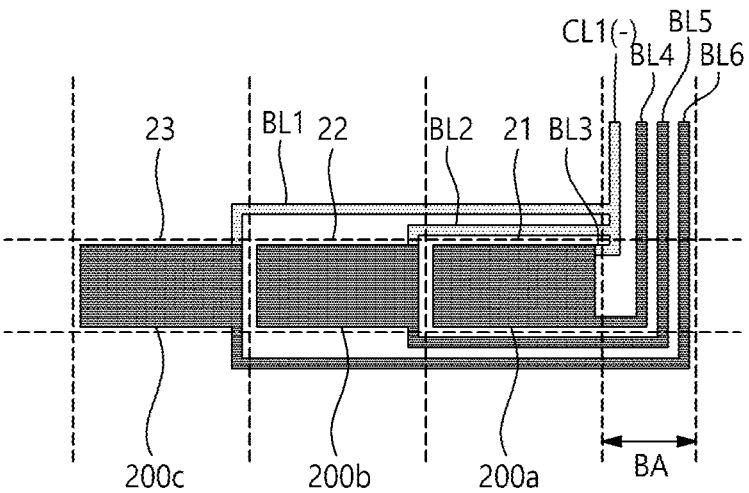
Figure 4D:
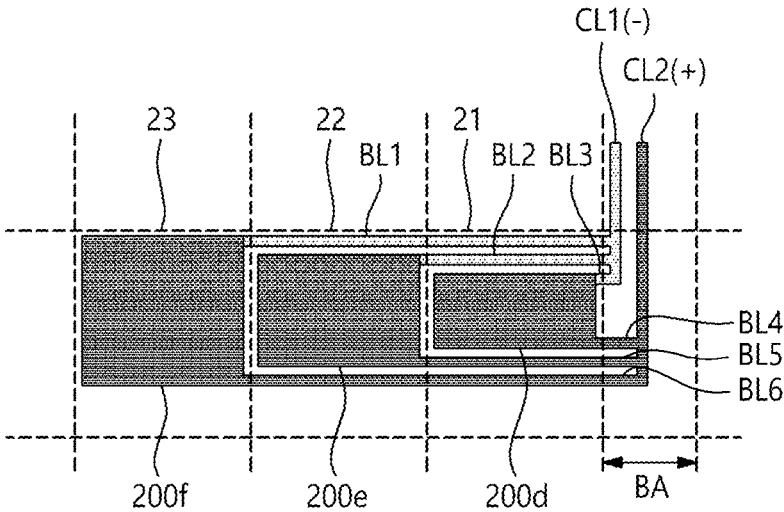

FIG. 4A is a partial plan view illustrating an example of a piezoelectric power generation element according to an embodiment of the disclosure. FIGS. 4B, 4C, and 4D are partial plan views illustrating an example of a piezoelectric power generation element and a bending detection line arranged on a piezoelectric element array film according to an embodiment of the disclosure.

Figure 6A:
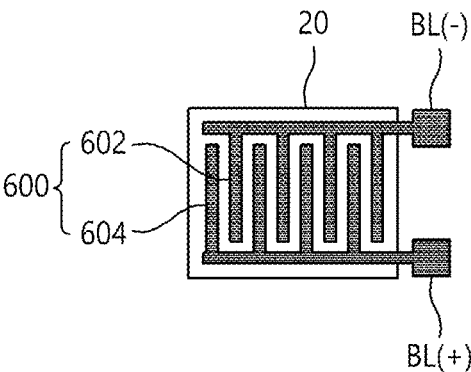
FIG. 6A is a partial plan view illustrating an example of a piezoelectric power generation element according to an embodiment of the disclosure.

Referring to FIG. 4A, the piezoelectric power generation element BE according to an embodiment of the disclosure can be provided as a face (type) electrode 200 or can be provided as a comb (type) electrode 600 as illustrated in FIG. 6A.

The piezoelectric power generation element BE provided as the face electrode 200 can include a first capacitor including a first face electrode 204 and a second face electrode 202 facing the first face electrode 204.

An elastic layer formed of a: flexible material can be provided between the first face electrode 204 and the second face electrode 202, and since the first face electrode 204 and the second face electrode 202 are disposed to face each other, a piezoelectric power generation element BE having the same structure as a capacitive element can be implemented.

The face electrode 200 can be provided as a pair of the first face electrode 204 and the second face electrode 202 for each unit section 20. Accordingly, the first face electrode 204 and the second face electrode 202 can maintain the shape of the piezoelectric element array film 10 and protect the internal components of the piezoelectric element array film 10 from an external impact. Further, the first face electrode 204 and the second face electrode 202 can be bendable materials. In particular, the first face electrode 204 can have a relatively weak strength compared to the second face electrode 202 so as to be bent in response to a weak pressure applied from the outside.

The first face electrode 204 and the second face electrode 202 can be formed of a conductive metal.

The elastic layer between the first face electrode 204 and the second face electrode 202 can include silicone, polymer, or the like. As an example of the polymer, one of polyimide and polyurethane can be included. However, the material of the elastic layer is not limited thereto, but various materials can be used that meet the conditions that they are contracted by external pressure, have elasticity to return to their original shape when the applied pressure is removed, and are an insulating material that electrically insulates the first face electrode 204 and the second face electrode 202.

Further, the elastic layer can be formed of a smart fluid as well as a material such as silicone or polymer.

Referring to FIGS. 3 and 4B, some unit sections 21, 22, and 23 of the piezoelectric element array film 10 can be disposed adjacent to each other on the same line in the horizontal direction. In an embodiment, the piezoelectric element array film 10 can include a first unit section 21 adjacent to the bezel area BA, a third unit section 23 adjacent to the central area of the display panel 110, and a second unit section 22 disposed between the first unit section 21 and the third unit section 23. These unit sections 21 to 23 represent a portion of the piezoelectric element array film 10 for convenience of description, and the number or shape of unit sections included in the piezoelectric element array film 10 is not limited thereto.

Referring to FIGS. 4A and 4B, the piezoelectric power generation element BE can include first capacitors 200a, 200b, and 200c including a first face electrode 204 and a second face electrode 202 facing the first face electrode 204, provided in the first unit section 21, the second unit section 22, and the third unit section 23, respectively.

In this case, as illustrated in FIG. 4B, the areas in which the first capacitors 200a, 200b, and 200c respectively provided in the first unit section 21, the second unit section 22, and the third unit section 23 occupy the plane of each unit section can be the same. Here, the areas of the first unit section 21, the second unit section 22, and the third unit section 23 are the same.

Alternatively, as illustrated in FIG. 4D, the areas in which the first capacitors 200d, 200e, and 200f respectively provided in the first unit section 21, the second unit section 22, and the third unit section 23 occupy the plane of each unit section can be different.

In other words, the first capacitor 200d provided in the first unit section 21, the first capacitor 200e provided in the second unit section 22, and the first capacitor 200f provided in the third unit section 23 can have different areas occupying the plane of each unit section. Here, the areas of the first unit section 21, the second unit section 22, and the third unit section 23 are different.

For example, as the first capacitor 200d provided in the first unit section 21, the first capacitor 200e provided in the second unit section 22, and the first capacitor 200f provided in the third unit section 23 approach the bezel area BA, the area occupying the plane of each unit section 20 can be reduced.

Referring to FIG. 4A, the first face electrode 204 provided in the unit section 20 can be connected to a bending detection line BL(+) for transferring a positive signal, and the second face electrode 202 can be connected to a bending detection line BL(−) for transferring a negative signal. The two bending detection lines BL(−) and BL(+) electrically connect the piezoelectric power generation element BE composed of the face electrodes 202 and 204 and the read-out circuit ROIC (FIG. 3).

The first face electrode 204 can be connected one-to-one to the first bending detection line BL(+), and the second face electrode 202 can be connected one-to-one to the second bending detection line BL(−).

Referring to FIG. 4B, the first face electrode 204 of the first capacitor 200a provided in the first unit section 21 can be connected to the first bending detection line BL4, and the second face electrode 202 can be connected to the second bending detection line BL3.

The first face electrode 204 of the first capacitor 200*b* provided in the second unit section 22 can be connected to the first bending detection line BL5, and the second face electrode 202 can be connected to the second bending detection line BL2.

The first face electrode 204 of the first capacitor 200*c* provided in the third unit section 23 can be connected to the first bending detection line BL6, and the second face electrode 202 can be connected to the second bending detection line BL1.

As illustrated in FIG. 4B, when the first face electrode 204 and the second face electrode 202 of the first capacitor disposed as the piezoelectric power generation elements BE in each unit section are connected one-to-one to the first bending detection lines BL4, BL5, and BL6 and the second bending detection lines BL1, BL2, and BL3, the width of the bezel area in which the first and second bending detection lines BL1 to BL6 are disposed may not be reduced.

In other words, in order to transfer the signal generated from the piezoelectric element array film 10 in which the plurality of piezoelectric power generation elements BE are arranged to the read-out circuit ROIC, the bending detection lines BL are wired to the left and right bezel areas BA of the display panel 110, and the width of the bezel area BA can be determined according to the number of bending detection lines BL.

When the precision of the degree of bending of the display panel 110 is required, the resolution needs to be increased, and thus more piezoelectric power generation elements BE need to be arranged. Accordingly, the number of bending detection lines BL disposed in the bezel area BA increases, ending up increasing the width of the bezel area BA.

In order to enhance such an issue, in an embodiment of the disclosure, as illustrated in FIGS. 4C and 4D, bending detection sharing lines CL1(−) and CL2(+) that share at least two bending detection lines in the bezel area BA are presented.

Specifically, referring to FIG. 4C, the second bending detection line BL3 connected to the second face electrode 202 of the first capacitor 200*a* provided in the first unit section 21, the second bending detection line BL2 connected to the second face electrode 202 of the first capacitor 200*b* provided in the second unit section 22, and the second bending detection line BL1 connected to the second face electrode 202 of the first capacitor 200*c* provided in the third unit section 23 can be jointly connected to a first bending detection common line CL1 in the bezel area BA.

Here, the first bending detection common line CL1(−) allows a common voltage (or a negative voltage) of the same potential to be applied from the read-out circuit ROIC to the second face electrode 202 of the first capacitors 200*a*, 200*b*, and 200*c* respectively disposed in the first unit section 21, the second unit section 22, and the third unit section 23.

Since the common voltage of the same potential can be applied to each of the first capacitors 200*a*, 200*b*, and 200*c*, the first bending detection common line CL1(−) shared with each of the second bending detection lines BL3, BL2, and BL1 can be employed.

Accordingly, in the examples illustrated in FIGS. 4C and 4D, the area occupied by the bending detection lines in the bezel area BA can be reduced, and thus the width of the bezel area BA can be reduced, compared to the example illustrated in FIG. 4B.

In FIG. 4C, each of the first bending detection line BL4 connected to the first face electrode 204 of the first capacitor 200*a* provided in the first unit section 21, the first bending detection line BL5 connected to the first face electrode 204 of the first capacitor 200*b* provided in the second unit section 22, and the first bending detection line BL6 connected to the first face electrode 204 of the first capacitor 200*c* provided in the third unit section 23 can be connected one-to-one to the read-out circuit ROIC through the bezel area BA.

Accordingly, bending detection signals generated by bending in each of the first capacitors 200*a*, 200*b*, and 200*c* disposed in the different unit sections 21, 22, and 23 can be transferred to the read-out circuit ROIC through the first bending detection lines BL4, BL5, and BL6 connected one-to-one to each of the first capacitors 200*a*, 200*b*, and 200*c*.

Accordingly, physical changes generated in different sizes in the same time in each of the first capacitors 200*a*, 200*b*, and 200*c* due to bending of the display panel 110 can be transferred to the read-out circuit ROIC through the independent first bending detection lines BL4, BL5, and BL6.

This corresponds to a sensing method using a phenomenon in which electrical changes occur when pressure is applied to a material. In other words, bending occurring on the display panel 110 can be detected using the piezoelectric effect in which a potential is generated across the side surface of the crystal forming the material when pressure is applied to the material from the outside.

Specifically, a positive charge can be applied to the first face electrode 204, and a negative charge can be applied to the opposite second face electrode 202, and a voltage value between the two face electrodes is sensed. There is no voltage input value at the expressed (+) and (−) electrodes, and only the voltage generated by bending can be sensed at the (+) electrode (the first face electrode 204) to obtain a sensing value (voltage value), thereby sensing an electrical change due to bending.

Referring to FIG. 4D, as illustrated in FIG. 4C, the second bending detection line BL3 connected to the second face electrode 202 of the first capacitor 200*a* provided in the first unit section 21, the second bending detection line BL2 connected to the second face electrode 202 of the first capacitor 200*b* provided in the second unit section 22, and the second bending detection line BL1 connected to the second face electrode 202 of the first capacitor 200*c* provided in the third unit section 23 can be integrated and connected to the first bending sensing common line CL1 in the bezel area BA.

Similarly, in FIG. 4D, the first bending detection common line CL1 allows a common voltage (or a negative voltage) of the same potential to be applied from the read-out circuit ROIC to the second face electrodes 202 of the first capacitors 200*a*, 200*b*, and 200*c* disposed in the first unit section 21, the second unit section 22, and the third unit section 23, respectively.

Since the common voltage of the same potential can be applied to each of the first capacitors 200*a*, 200*b*, and 200*c*, the first bending detection common line CL1(−) shared with each of the second bending detection lines BL3, BL2, and BL1 can be employed.

On the other hand, unlike the example illustrated in FIG. 4C, in the example illustrated in FIG. 4D, the first bending detection line BL4 connected to the first face electrode 204 of the first capacitor 200*a* provided in the first unit section 21, the first bending detection line BL5 connected to the first face electrode 204 of the first capacitor 200*b* provided in the second unit section 22, and the first bending detection line BL6 connected to the first face electrode 204 of the first capacitor 200c provided in the third unit section 23 can be integrated and connected to the second bending detection common line CL2 (+) in the bezel area BA.

In order to independently transfer the bending detection signals generated in each of the first capacitors 200a, 200b, and 200c to the read-out circuit ROIC through the second bending detection common line CL2(+), a difference can be made in the capacity of each of the first capacitors 200a, 200b, and 200c.

A difference can be made in the capacity of each of the first capacitors 200a, 200b, and 200c so that ranges of physical change amounts occurring in each of the first capacitors 200a, 200b, and 200c does not overlap each other due to bending occurring in the display panel 110.

Thus, the read-out circuit ROIC can estimate the unit section in which the bending detection signal is generated in the first capacitor, among the first unit section 21, the second unit section 22, and the third unit section 23, based on the magnitude range of the bending detection signal transferred through the second bending detection common line CL2(+).

For example, for the first capacitor 200a disposed in the first unit section 21, when bending occurs on the display panel 110, a change in capacitance as a bending occurrence estimation range can be set from a minimum of 1 to a maximum of 10, for the first capacitor 200b, a change in capacitance as a bending occurrence estimation range can be set from a minimum of 20 to a maximum of 29, and for the first capacitor 200c, a change in capacitance as a bending occurrence estimation range can be set from a minimum of 30 to 39. Each of the above-described bending occurrence estimation ranges is an example of a relative numerical value regarding capacitance, and is not an absolute numerical value of the change in capacitance of each of the first capacitors 200a, 200b, and 200c.

Figure 5:
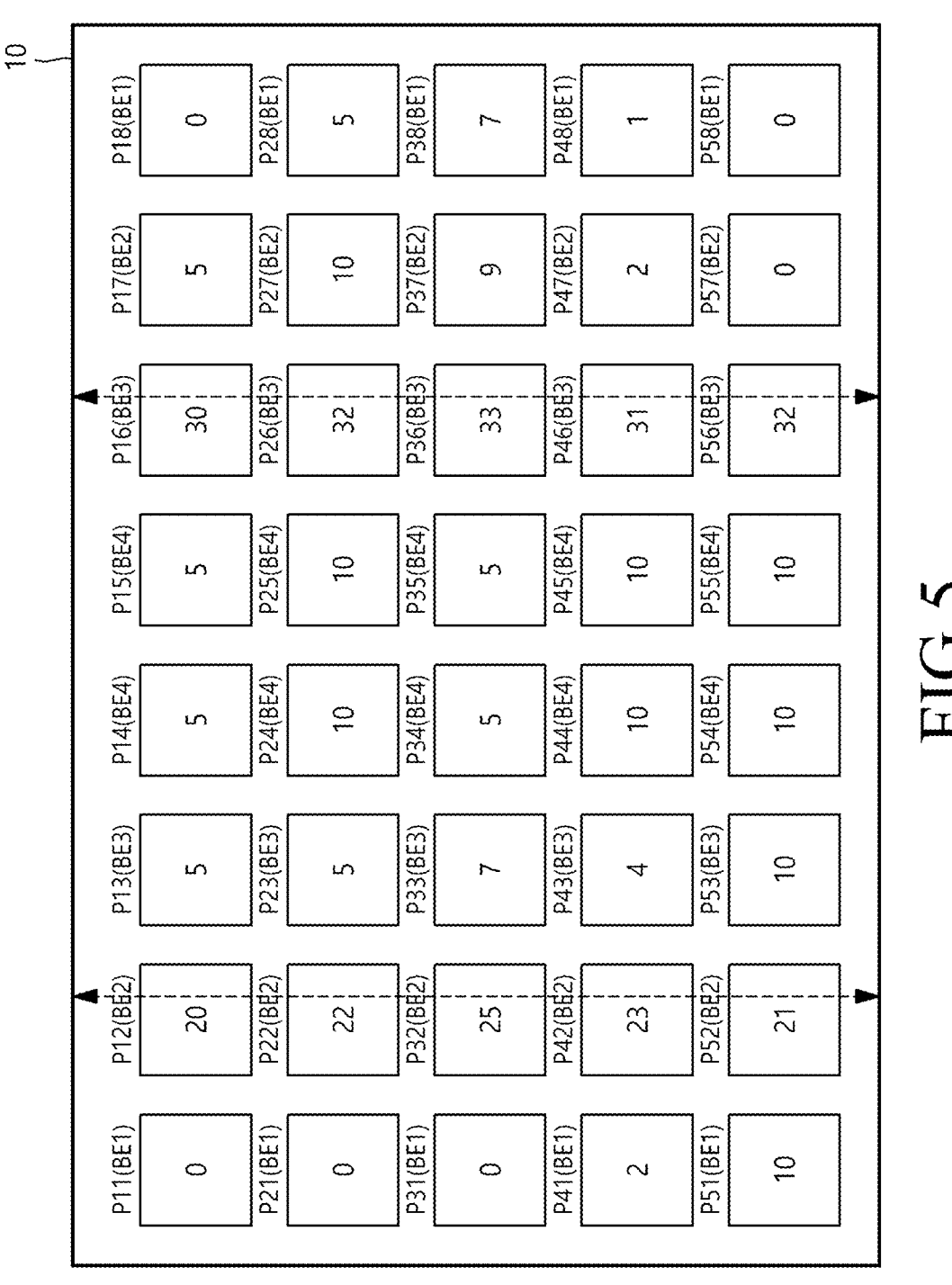
FIG. 5 is a plan view illustrating an example of a change in capacitance for each unit section of a piezoelectric element array film according to an embodiment of the disclosure.

When this is applied to the piezoelectric element array film 10 illustrated in FIG. 5, since the change in capacitance of each of the first capacitors 200b disposed in the unit sections P12, P22, P32, P42, and P52 arranged in the column direction of the piezoelectric element array film 10 is 20 or more, which corresponds to the bending occurrence estimation range, the read-out circuit ROIC can estimate the occurrence of bending in a direction of connecting the unit sections P12, P22, P32, P42, and P52 based on the change in capacitance. Further, the bending occurrence position can be estimated based on the unit sections P12, P22, P32, P42, and P52.

Further, since the change in the capacitance of each of the third capacitors 200c disposed in the unit sections P16, P26, P36, P46, and P56 arranged in the column direction in the piezoelectric element array film 10 is 30 or more, which corresponds to the bending occurrence estimation range, the read-out circuit ROIC can estimate the bending occurrence in the position and direction of connecting the unit sections P16, P26, P36, P46, and P56 based on the change value of the capacitance.

Figure 6B:
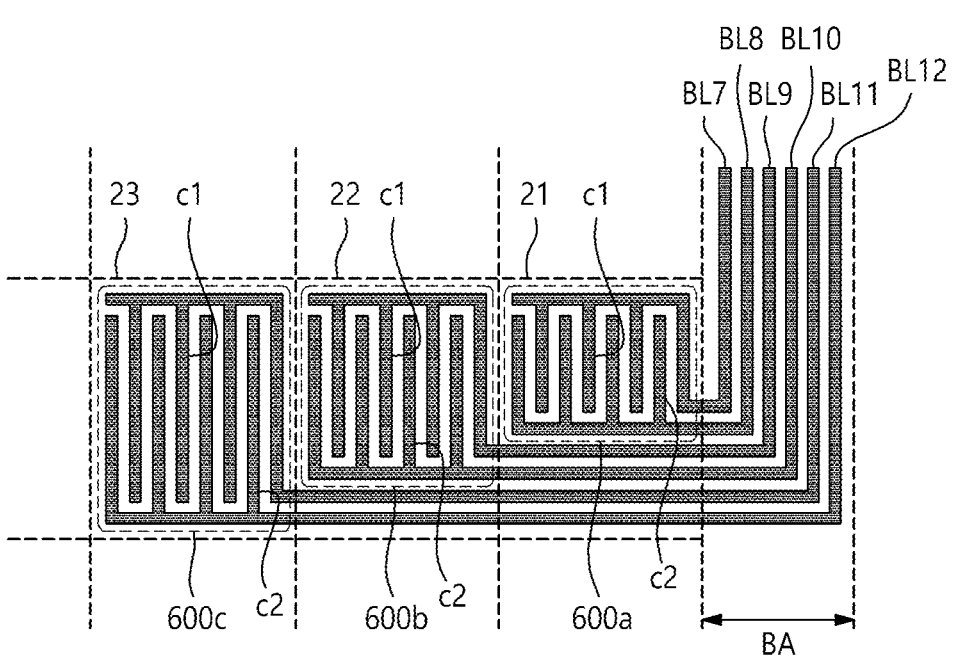
FIG. 6B is a partial plan view illustrating an example of a piezoelectric power generation element and a bending detection line arranged on a piezoelectric element array film according to an embodiment of the disclosure.

FIG. 6A is a partial plan view illustrating an example of a piezoelectric power generation element according to an embodiment of the disclosure. FIG. 6B is a partial plan view illustrating an example of a piezoelectric power generation element and a bending detection line arranged on a piezoelectric element array film 10 according to an embodiment of the disclosure.

Referring to FIG. 6A, the piezoelectric power generation element BE can be provided as a comb (type) electrode 600.

The piezoelectric power generation element BE provided as the comb electrode 600 can include a first comb electrode 602 and a second comb electrode 604.

Specifically, in the comb electrode 600, the plurality of first comb teeth 602 of the first comb electrode 602 and the plurality of second comb teeth 604 of the second comb electrode 604 are alternately arranged, so that the pair of first comb tooth 602 and second comb tooth 604 forms one small capacitor, and these small capacitors are connected to form one large capacitor. With this structure, the capacitor configured for each unit section 20 of the piezoelectric element array film 10 can be referred to as a second capacitor.

An elastic layer of a flexible material can be provided between the first comb electrode 602 and the second comb electrode 604, and as the plurality of first comb teeth 602 of the first comb electrode 602 and the plurality of second comb teeth 604 of the second comb electrode 604 are disposed to face each other, a piezoelectric power generation element BE having the same structure as a capacitive element can be implemented.

As the plurality of first comb teeth 602 and the plurality of second comb teeth 604, as the comb electrode 600, are alternately disposed in each unit section 20, the second capacitor can be disposed.

The first comb electrode 602 and the second comb electrode 604 can be bendable materials.

The first comb electrode 602 and the second comb electrode 604 can be formed of a conductive metal.

The elastic layer between the first comb electrode 602 and the second comb electrode 604 can include silicone, polymer, or the like. As an example of the polymer, one of polyimide and polyurethane can be included. However, the material of the elastic layer is not limited thereto, but various materials can be used that meet the conditions that they are contracted by external pressure, have elasticity to return to their original shape when the applied pressure is removed, and are an insulating material that electrically insulates the first comb electrode 602 and the second comb electrode 604.

Further, the elastic layer can be formed of a smart fluid as well as a material such as silicone or polymer.

Referring to FIGS. 3 and 6B, some unit sections 21, 22, and 23 of the piezoelectric element array film 10 can be disposed adjacent to each other on the same line in the horizontal direction, and can include a first unit section 21 adjacent to the bezel area BA, a third unit section 23 adjacent to the central area of the display panel 110, and a second unit section 22 disposed between the first unit section 21 and the third unit section 23. These unit sections 21 to 23 represent a portion of the piezoelectric element array film 10 for convenience of description, and the unit sections included in the piezoelectric element array film 10 are not limited thereto.

Referring to FIGS. 6A and 6B, the piezoelectric power generation element BE can include second capacitors 600a, 600b, and 600c in which a plurality of first comb teeth of the first comb electrode 604 and a plurality of second comb teeth of the second comb electrode 602 provided in each of the first unit section 21, the second unit section 22, and the third unit section 23 are alternately disposed.

In this case, as illustrated in FIG. 6B, the second capacitor 600a provided in the first unit section 21, the second capacitor 600b provided in the second unit section 22, and the second capacitor 600c provided in the third unit section 23 can be formed so that the length in the vertical direction of the first comb electrode 604 and the second comb electrode 602 constituting each capacitor decreases as they approach the bezel area BA.

Accordingly, the areas in which the second capacitors 600*a*, 600*b*, and 600*c* respectively provided in the first unit section 21, the second unit section 22, and the third unit section 23 occupy the plane of each unit section can be different.

In other words, the second capacitor 600*a* provided in the first unit section 21, the second capacitor 600*b* provided in the second unit section 22, and the second capacitor 600*c* provided in the third unit section 23 can have different areas occupying the plane of each unit section. Here, the areas of the first unit section 21, the second unit section 22, and the third unit section 23 can be different or the same.

For example, as the second capacitor 600*a* provided in the first unit section 21, the second capacitor 600*b* provided in the second unit section 22, and the second capacitor 600*c* provided in the third unit section 23 approach the bezel area BA, the area occupying the plane of each unit section can be reduced.

Referring to FIG. 6A, the comb electrode 600 provided in the unit section 20 can be connected to the bending detection line BL. The bending detection line BL electrically connects the piezoelectric power generation element BE composed of the comb electrode 600 and the read-out circuit ROIC (FIG. 3).

The first comb electrode 604 provided in the unit section 20 can be connected to the bending detection line BL(+) for transferring a positive signal, and the second comb electrode 602 can be connected to the bending detection line BL(−) for transferring a negative signal. The two bending detection lines BL(−) and BL(+) electrically connect the piezoelectric power generation element BE composed of the comb electrodes 602 and 604 and the read-out circuit ROIC (FIG. 3).

Here, the first comb electrode 604 can be connected one-to-one to the second bending detection line BL(+), and the second comb electrode 602 can be connected one-to-one to the first bending detection line BL(−).

Referring to FIG. 6B, the first comb electrode 604 of the second capacitor 600*a* provided in the first unit section 21 can be connected to the read-out circuit ROIC (FIG. 3) through the fourth bending detection line BL8, and the second comb electrode 602 can be connected to the read-out circuit ROIC (FIG. 3) through the third bending detection line BL7.

The first comb electrode 604 of the second capacitor 600*b* provided in the second unit section 22 can be connected to the read-out circuit ROIC through the fourth bending detection line BL10, and the second comb electrode 602 can be connected to the read-out circuit ROIC through the third bending detection line BL9.

The first comb electrode 604 of the second capacitor 600*c* provided in the third unit section 23 can be connected to the read-out circuit ROIC through the fourth bending detection line BL12, and the second comb electrode 602 can be connected to the read-out circuit ROIC through the third bending detection line BL11.

Each of the third bending detection lines BL7, BL9, and BL11 can allow a common voltage (or a negative voltage) to be applied from the read-out circuit ROIC to the second comb electrode 602 of the second capacitors 600*a*, 600*b*, and 600*c* disposed in the first unit section 21, the second unit section 22, and the third unit section 23, respectively.

Bending detection signals generated by bending in each of the second capacitors 600*a*, 600*b*, and 600*c* disposed in the different unit sections 21, 22, and 23 are transferred to the read-out circuit ROIC through the fourth bending detection lines BL8, BL10, and BL12 respectively connected one-to-one to the second capacitors 600*a*, 600*b*, and 600*c*, thereby transferring physical changes generated in different sizes in the same time in each of the second capacitors 600*a*, 600*b*, and 600*c* due to bending of the display panel 110 through the independent fourth bending detection lines BL8, BL10, and BL12 to the read-out circuit ROIC.

Figure 7A:
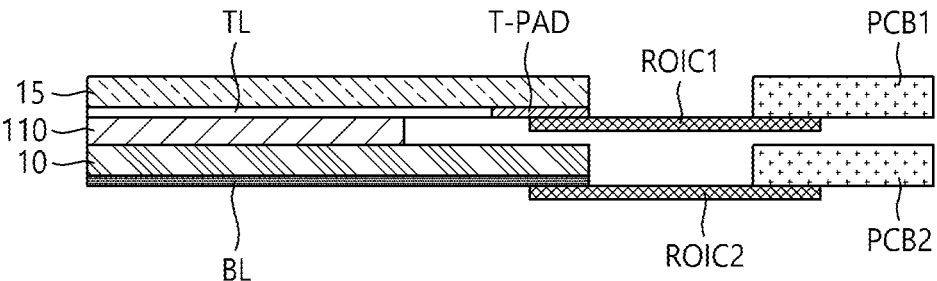
FIGS. 7A and 7B are cross-sectional views illustrating examples of a cross-sectional structure of a display device detecting bending position coordinates according to an embodiment of the disclosure.
Figure 7B:
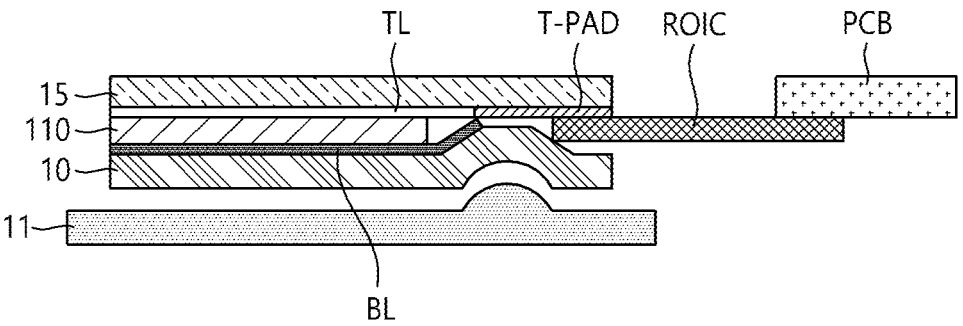

FIGS. 7A and 7B are cross-sectional views illustrating examples of a cross-sectional structure of a display device detecting bending position coordinates according to an embodiment of the disclosure.

Referring to FIG. 7A, in an embodiment, a display device 100 can include a display panel 110 displaying an image, touch electrodes 15 disposed on the display panel 110, a touch line TL connected from the touch electrodes 15 to a read-out circuit ROIC, a piezoelectric element array film 10 disposed under the display panel 110, piezoelectric power generation elements BE disposed on the piezoelectric element array film 10 in a matrix structure, a bending detection line BL connected to each piezoelectric power generation element BE, a touch detection pad T-PAD connected to the touch line TL to receive a touch detection signal transferred from the touch line TL, a first read-out circuit ROIC1 connected to the touch detection pad T-PAD to receive the touch detection signal and transfer the touch detection signal to a PCB1, the PCB1 electrically connected to the first read-out circuit ROIC1, a second read-out circuit ROIC2 connected to the bending detection line BL to receive the bending detection signal transferred from the bending detection line BL, and a PCB2 electrically connected to the second read-out circuit ROIC2.

In FIG. 7A, the configurations of receiving the signal transferred from the touch line TL and the bending detection line BL are individually provided one-to-one as a first read-out circuit ROIC1 and a second read-out circuit ROIC2.

Alternatively, the display device according to an embodiment of the disclosure can share a read-out circuit ROIC as shown in FIG. 7B, and can receive the signal transferred from each of the touch line TL and the bending detection line BL through one touch signal pad T-PAD.

Specifically, referring to FIG. 7B, a display device 100 according to an embodiment of the disclosure can include a display panel 110 displaying an image, touch electrodes 15 disposed over the display panel 110, a touch line TL connected from the touch electrodes 15 to a read-out circuit ROIC, a piezoelectric element array film 10 disposed under the display panel 110, piezoelectric power generation elements BE disposed in a matrix structure on the piezoelectric element array film 10, a bending detection line BL connected to each piezoelectric power generation element BE, a touch detection pad T-PAD commonly connected to the touch line TL and the bending detection line BL, a read-out circuit ROIC, and a touch controller RP. A jig 11 for attaching the piezoelectric element array film 10 illustrated below the piezoelectric element array film 10 is a component that includes a jig so that a concave or convex portion is formed in at least a portion of the piezoelectric element array film 10 and can be a component that is used only during the process.

When the piezoelectric element array film 10 is pressed on the wearable panel 110 and the touch pad T-PAD, at least a portion of the piezoelectric element array film 10 can be convexly bent by the jig 11 for attaching the piezoelectric element array film so that the touch pad T-PAD and the piezoelectric element array film 10 can come into contact with each other.

Here, the read-out circuit ROIC is shared by the touch line TL and the bending detection line BL. In order to share the read-out circuit ROIC by the touch line TL and the bending detection line BL, the touch detection pad T-PAD can be disposed to be longer than FIG. 7A, thereby bonding or contacting the lower piezoelectric element array film 10.

In an embodiment, in the touch mode section, the touch line TL can be connected to the touch detection pad T-PAD, and the bending detection line BL may not be connected to the touch detection pad T-PAD.

In the bending mode section, the bending detection line BL can be connected to the touch detection pad T-PAD, and the touch line TL may not be connected to the touch detection pad T-PAD.

Figure 8:
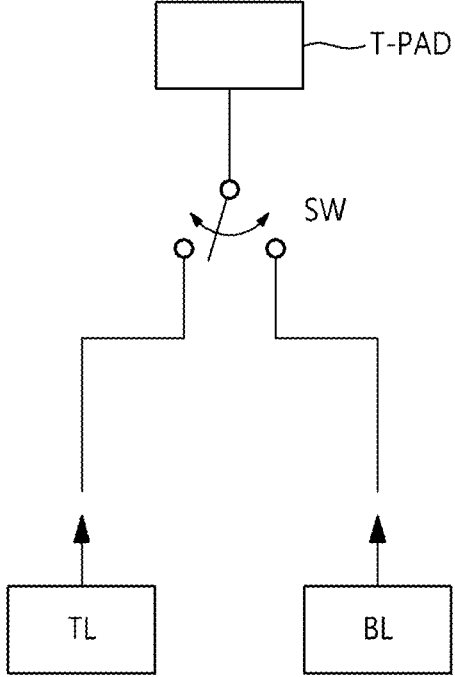
FIG. 8 illustrates an example of a switch adopted according to an embodiment of the disclosure.

To that end, as illustrated in FIG. 8, a switch SW can be provided between the touch line TL and the bending detection line BL, so that the touch line TL or the bending detection line BL can be selectively connected to the touch signal pad T-PAD according to the driving mode.

The switch SW can electrically connect one of the touch line TL and the bending detection line BL to the touch signal pad T-PAD according to the driving mode (touch mode or bending mode).

Figure 9:
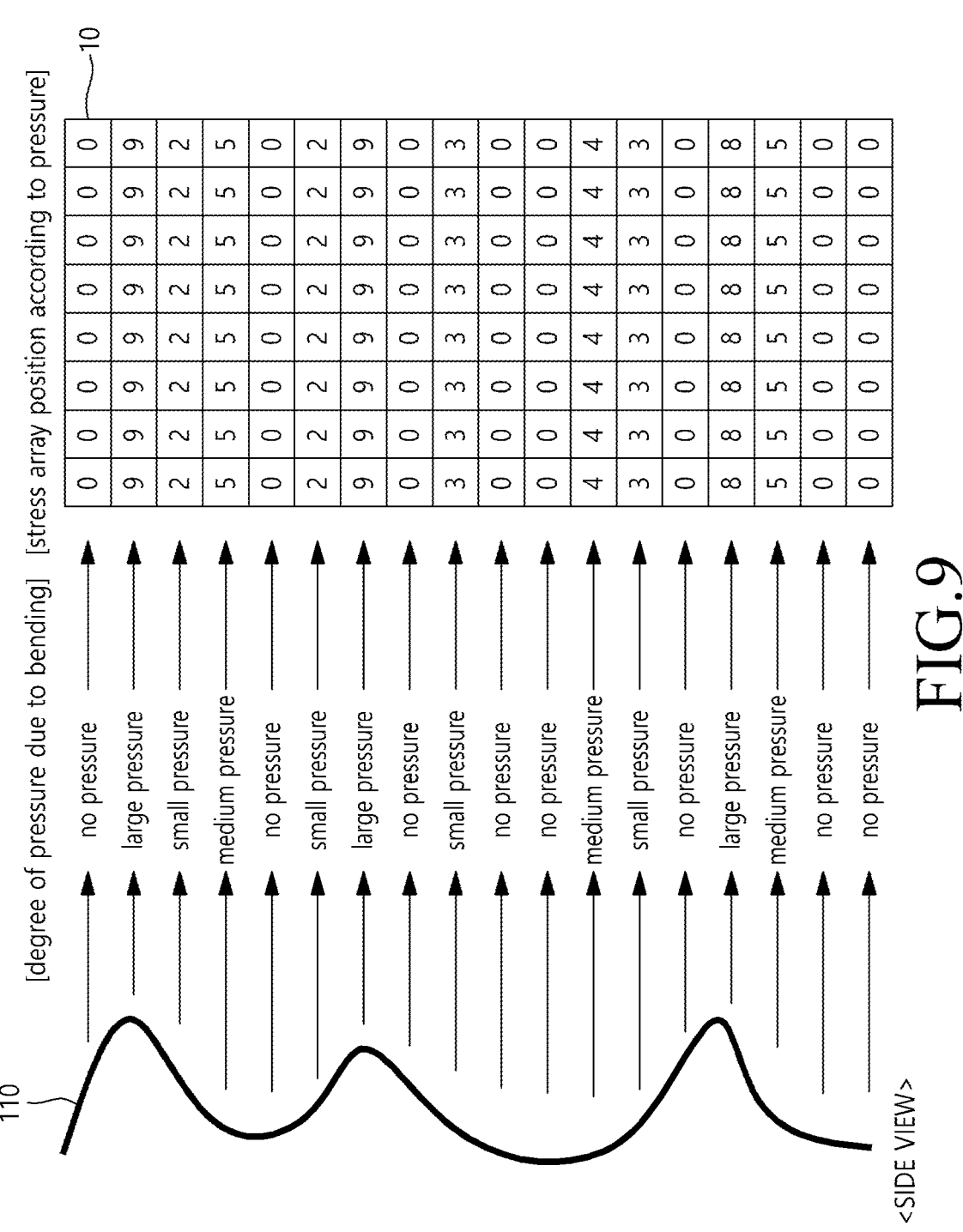
FIG. 9 is an example plan view illustrating a degree of stress which can be caused in a piezoelectric element array film when bending occurs in a display panel according to an embodiment of the disclosure.

FIG. 9 is an example plan view illustrating a degree of stress caused in a piezoelectric element array film when bending occurs in a display panel according to an embodiment of the disclosure.

Referring to FIG. 9, the degree of stress caused by bending can be detected for unit sections arranged in a matrix structure on the piezoelectric element array film 10 based on a change in physical quantity generated by the piezoelectric element.

Since the piezoelectric power generation element is composed of a capacitor, the change in physical quantity can be a change in capacitance, and the degree of stress caused by bending can also be a numerical value related to capacitance.

When bending occurs on the display panel 110 in the row direction, pressure is generated to the display panel 110 by bending, and accordingly, the degree of stress caused by the pressure detected in the plurality of unit sections arranged in the row direction can be detected as different according to the row.

The stress of the piezoelectric power generation element detected for each of the same rows of the unit sections can be transferred to the read-out circuit C through the above-described bending detection line BL, and the bending detection signal BDS signal-processed through the read-out circuit ROIC can be transferred to the read-out processor RP.

Accordingly, the read-out processor RP can execute a bending algorithm using the bending detection signal BDS, thereby determining whether there is bending and/or a bending position.

The object for detecting the degree of stress changed by bending can be one for each same column, row, or unit section, but is not limited thereto.

Figure 10:
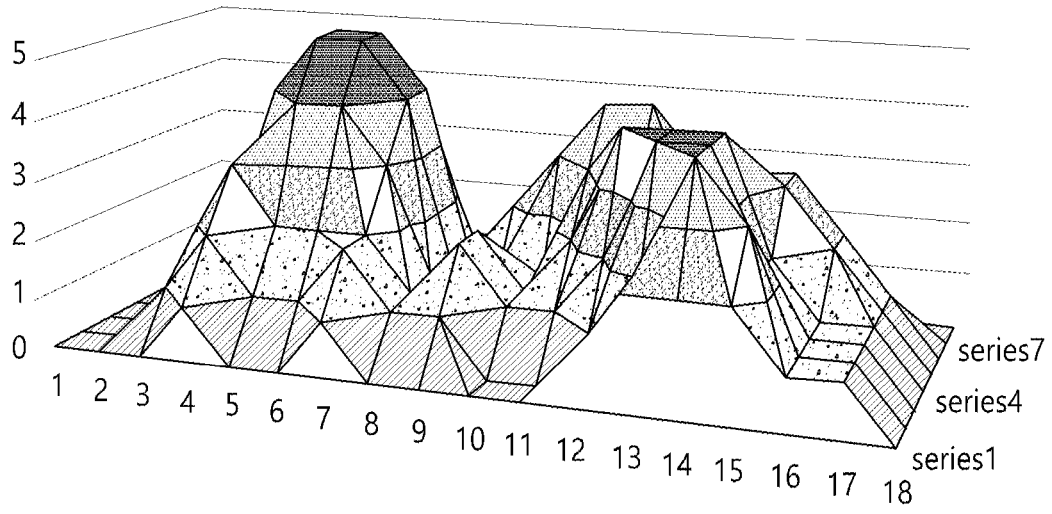
FIG. 10 is a 3D graph illustrating an example of a curve due to bending of a display device according to an embodiment of the disclosure.

FIG. 10 is a 3D graph illustrating an example of a curve due to bending of a display device according to an embodiment of the disclosure.

Referring to FIG. 10, according to an embodiment of the disclosure, the read-out processor RP can represent the bending of the display panel 110 in three dimensions according to the presence or absence of bending and the bending position determined for each unit section of the piezoelectric element array film 10.

Figure 11:
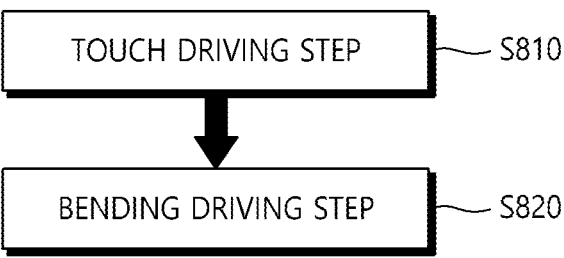
FIG. 11 is a flowchart illustrating a method for detecting a bending position of a display device according to an embodiment of the disclosure.

FIG. 11 is a flowchart illustrating a method for detecting a bending position of a display device according to an embodiment of the disclosure. A detailed description of overlapping functions of the same components as those included in the display device 100 illustrated in FIGS. 1 to 9 is omitted or may be briefly provided.

Referring to FIG. 11, a method for detecting a bending position of a display device according to an embodiment of the disclosure can include detecting, by a read-out processor, a touch signal generated in a display panel in a touch mode section based on an integrated pad (S810), and detecting, by the read-out processor, a bending signal generated in the display panel in a bending mode section based on the integrated pad (S820).

Detecting the bending signal (S820) can include detecting, per coordinates, a capacitance change amount occurring in piezoelectric power generation elements provided for each unit section of the piezoelectric element array film, in a matrix structure and overlapping the display panel and detecting bending coordinates where bending occurs based on the capacitance change amount detected per coordinates of the piezoelectric power generation elements.

Coordinates where the capacitance change amount is larger than a preset bending occurrence estimation range per coordinates of the piezoelectric power generation elements can be detected as the bending coordinates.

Then, the read-out processor can store a bending detection signal including bending coordinates where bending is estimated as occurring. Then, the read-out processor can change a threshold signal level of a touch electrode disposed at a touch panel position corresponding to the bending coordinates in a next touch mode section based on the stored bending detection signal. Here, the threshold signal level of the touch electrode can be a capacitance value that is a reference for the touch electrode to recognize a stimulus applied from the outside as a touch electrode.

In other words, by changing the threshold signal level of the touch electrode corresponding to the bending coordinates where bending is estimated as occurring in the display panel 110, the touch detection reference value affected by the bending can be changed.

Here, the touch mode section and the bending mode section can be set by time-division of a blank section of one frame period.

Embodiments of the disclosure described above can be briefly described as below.

A display device according to an embodiment of the disclosure can comprise a bendable display panel displaying an image, a piezoelectric element array film overlapping the display panel, having piezoelectric power generation elements arranged in a matrix structure, and detecting a capacitance change amount generated in the piezoelectric power generation elements according to bending of the display panel, a read-out circuit receiving and processing a bending detection signal including the capacitance change amount generated in the piezoelectric power generation elements, and a read-out processor detecting whether bending of the display panel occurs and a position where bending occurs, based on the bending detection signal.

The piezoelectric element array film can include unit sections disposed into a matrix structure. Each of the unit sections can overlap an area in which a plurality of subpixels are disposed.

The unit sections of the piezoelectric element array film can be disposed adjacent to each other on the same line in a horizontal direction, and include a first unit section adjacent to a bezel area, a third unit section adjacent to a central area, and a second unit section disposed between the first unit section and the third unit section.

The piezoelectric power generation element can include a first capacitor including a first face electrode provided in each of the first unit section, the second unit section, and the third unit section, and a second face electrode spaced apart from, and facing, the first face electrode by a predetermined interval.

Areas in which the first capacitors provided in the first unit section, the second unit section, and the third unit section, respectively, occupy a plane of each unit section can be the same.

As the first capacitor provided in each of the first unit section, the second unit section, and the third unit section approaches the bezel area, an area in which the first capacitor occupies a plane of each of the unit sections can decrease.

A first bending detection line can be connected one-to-one between the first face electrode and the read-out circuit, and a second bending detection line can be connected one-to-one between the second face electrode and the read-out circuit, in each of the first unit section, the second unit section, and the third unit section.

A first bending detection line can be connected one-to-one to the first face electrode in each of the first unit section, the second unit section, and the third unit section, and a plurality of first bending detection lines connected to the first to third unit sections can be shared as one first electrode integrated line in the bezel area of the display panel.

A first bending detection line can be connected one-to-one to the first face electrode in each of the first unit section, the second unit section, and the third unit section, and a plurality of second bending detection lines connected to the first to third unit sections can be shared as one second electrode integrated line in the bezel area of the display panel.

The piezoelectric power generation element can be a second capacitor including a first comb electrode provided in each of the first unit section, the second unit section, and the third unit section, and a second comb electrode having comb teeth alternately disposed with comb teeth of the first comb electrode.

The second capacitor provided in each of the first unit section, the second unit section, and the third unit section can decrease in vertical length of the first comb electrode and the second comb electrode as it approaches the bezel area.

A third bending detection line can be connected one-to-one between the first comb electrode provided in each of the first unit section, the second unit section, and the third unit section and the read-out circuit, and a fourth bending detection line can be connected one-to-one between the second comb electrode and the read-out circuit.

The read-out processor can compare the capacitance change amount detected for each unit section with a preset bending occurrence estimation range.

The read-out processor can compare the capacitance change amount detected for each unit section with a preset bending occurrence estimation range. Bending occurrence estimation ranges set for the first capacitors having different areas occupying the plane for each unit section can be different from each other.

The bending occurrence estimation ranges set for the first capacitors provided in each of the first unit section, the second unit section, and the third unit section may not overlap each other.

A method for detecting a bending position of a display device according to an embodiment of the disclosure can include detecting, by a read-out processor, a touch signal generated in a display panel in a touch mode section based on an integrated pad, and detecting, by the read-out processor, a bending signal generated in the display panel in a bending mode section based on the integrated pad.

Detecting the bending signal can include detecting, per coordinates, a capacitance change amount occurring in piezoelectric power generation elements provided in a matrix structure and overlapping the display panel and detecting a position where bending occurs based on the capacitance change amount detected per coordinates of the piezoelectric power generation elements.

Detecting the bending coordinates can detect coordinates where the capacitance change amount is larger than a preset bending occurrence estimation range per coordinates of the piezoelectric power generation elements as the bending coordinates.

The touch mode section and the bending mode section can be set by time-division of a blank section of one frame period.

The method can further comprise storing, by the read-out processor, a bending detection signal including bending coordinates where bending is estimated as occurring and changing, by the read-out processor, a threshold signal level of a touch electrode disposed at a touch panel position corresponding to the bending coordinates in a next touch mode section, based on the stored bending detection signal.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. For example, the disclosed embodiments are intended to illustrate the scope of the technical idea of the disclosure.

What is claimed is:

1. A display device, comprising:

a bendable display panel configured to display an image;

a piezoelectric element array film overlapping the display panel, having piezoelectric power generation elements arranged in a matrix structure, and configured to detect a capacitance change amount generated in the piezoelectric power generation elements according to bending of the display panel;

a read-out circuit configured to receive and process a bending detection signal including the capacitance change amount generated in the piezoelectric power generation elements; and a read-out processor configured to detect whether bending of the display panel occurs and a position where the bending occurs, based on the bending detection signal, wherein the piezoelectric element array film includes unit sections divided into a matrix structure, wherein each of the unit sections overlaps an area in which a plurality of subpixels are disposed, wherein the unit sections of the piezoelectric element array film are disposed adjacent to each other on a same line in a horizontal direction, wherein the unit sections include a first unit section adjacent to a bezel area, a third unit section adjacent to a central area, and a second unit section disposed between the first unit section and the third unit section, wherein one of the piezoelectric power generation elements includes:

a first capacitor including a first face electrode provided in each of the first unit section, the second unit section, and the third unit section, and a second face electrode spaced apart from and facing the first face electrode by a predetermined interval, wherein a first bending detection line is connected one-to-one between the first face electrode and the read-out circuit, and wherein a second bending detection line is connected one-to-one between the second face electrode and the read-out circuit, in each of the first unit section, the second unit section, and the third unit section.

2. The display device of claim 1, wherein areas, in which the first capacitors provided in the first unit section, the second unit section, and the third unit section, respectively, occupy a plane of each unit section, are the same.

3. The display device of claim 2, wherein the read-out processor compares the capacitance change amount detected for each unit section with a preset bending occurrence estimation range, and wherein bending occurrence estimation ranges set for the first capacitors having different areas occupying the plane for each unit section are different from each other.

4. The display device of claim 1, wherein the read-out processor compares the capacitance change amount detected for each unit section with a preset bending occurrence estimation range.

5. A display device, comprising:

a bendable display panel configured to display an image;

a piezoelectric element array film overlapping the display panel, having piezoelectric power generation elements arranged in a matrix structure, and configured to detect a capacitance change amount generated in the piezoelectric power generation elements according to bending of the display panel;

a read-out circuit configured to receive and process a bending detection signal including the capacitance change amount generated in the piezoelectric power generation elements; and a read-out processor configured to detect whether bending of the display panel occurs and a position where the bending occurs, based on the bending detection signal, wherein the piezoelectric element array film includes unit sections divided into a matrix structure, wherein each of the unit sections overlaps an area in which a plurality of subpixels are disposed, wherein the unit sections of the piezoelectric element array film are disposed adjacent to each other on a same line in a horizontal direction, wherein the unit sections include a first unit section adjacent to a bezel area, a third unit section adjacent to a central area, and a second unit section disposed between the first unit section and the third unit section, wherein one of the piezoelectric power generation elements includes:

a first capacitor including a first face electrode provided in each of the first unit section, the second unit section, and the third unit section, and a second face electrode spaced apart from and facing the first face electrode by a predetermined interval, wherein areas in which the first capacitors provided in the first unit section, the second unit section, and the third unit section, respectively, occupy a plane of each unit section are the same, wherein the read-out processor compares the capacitance change amount detected for each unit section with a preset bending occurrence estimation range, wherein bending occurrence estimation ranges set for the first capacitors having different areas occupying the plane for each unit section are different from each other, and wherein the bending occurrence estimation ranges set for the first capacitors provided in each of the first unit section, the second unit section, and the third unit section do not overlap with each other.

* * * * *